United States Patent [19]
Flynn et al.

[11] Patent Number: 5,667,566
[45] Date of Patent: Sep. 16, 1997

[54] APPARATUS FOR WATER VAPOR REMOVAL FROM A COMPRESSED GAS

[75] Inventors: Paul E. Flynn, Wernersville; Peter D. Wersant, Sinking Spring, both of Pa.

[73] Assignee: Reading Technologies, Inc., Reading, Pa.

[21] Appl. No.: 615,584

[22] Filed: Mar. 12, 1996

Related U.S. Application Data

[63] Continuation of Ser. No. 347,553, Nov. 29, 1994, abandoned, which is a continuation-in-part of Ser. No. 755,694, Sep. 6, 1991, Pat. No. 5,403,387.

[51] Int. Cl.$^6$ .............. B01D 53/04; B01D 53/26
[52] U.S. Cl. .............. 96/138; 96/136; 96/140; 55/275
[58] Field of Search .............. 95/122; 96/108, 96/130–132, 134, 137, 138, 140–143; 55/274, 275; 210/444, 445

[56] References Cited

U.S. PATENT DOCUMENTS

| | | | |
|---|---|---|---|
| 189,771 | 4/1877 | Morgan | 210/445 |
| 2,096,851 | 10/1937 | Fricke | 96/132 |
| 2,325,657 | 8/1943 | Burkness | 55/274 X |
| 2,471,069 | 5/1949 | LeClair | 210/444 X |
| 2,669,318 | 2/1954 | Briggs | 96/131 |
| 2,727,634 | 12/1955 | O'Meara | 210/445 |

(List continued on next page.)

FOREIGN PATENT DOCUMENTS

| | | | |
|---|---|---|---|
| 932273 | 8/1973 | Canada | 55/387 |
| 852538 | 10/1952 | Germany | 55/387 |
| 2854710 | 7/1980 | Germany | 55/387 |
| 5254682 | 5/1977 | Japan | 55/387 |

*Primary Examiner*—Robert Spitzer
*Attorney, Agent, or Firm*—Synnestvedt & Lechner

[57] ABSTRACT

A moisture removal device for compressed gas lines and the like includes a connection head having a gas inlet and a gas outlet. An elongated housing having an internal cavity is attached to the connection head with the use of a clamp ring. The elongated tube and head are sealed to each other with the aid of O-rings preventing the escape of the compressed gases. Internal of the housing is a cartridge containing desiccant media for the removal of water vapor from a compressed gas. The cartridge is sealed and supported to the connection head with the use of a centrally threaded rod and O-rings located between the cartridge and the connection head. The external body of the desiccant cartridge is impermeable to gas and forces compressed gas from the inlet of the connection head to the bottom of the elongated housing. At the bottom of the housing, the gas inverts and enters the cartridge through the plurality of openings in the removable bottom plate of the desiccant cartridge and is forced to pass through the entire length of the desiccant bed. The gas which is decreased in humidity level is then allowed to exit the cartridge and leaves the housing through the gas egress in the connection head.

13 Claims, 4 Drawing Sheets

U.S. PATENT DOCUMENTS

| | | | |
|---|---|---|---|
| 2,758,719 | 8/1956 | Line | 55/387 X |
| 2,808,937 | 10/1957 | O'Meara | 210/445 |
| 2,894,600 | 7/1959 | Veres | 55/274 X |
| 2,895,613 | 7/1959 | Griffiths | 210/445 X |
| 2,930,445 | 3/1960 | Glass et al. | 96/131 |
| 3,067,880 | 12/1962 | Bowers et al. | 210/444 X |
| 3,122,501 | 2/1964 | Hultgren | 210/444 X |
| 3,147,220 | 9/1964 | Avery | 210/445 X |
| 3,171,726 | 3/1965 | Roney et al. | 55/275 X |
| 3,229,817 | 1/1966 | Pall | 210/445 X |
| 3,241,679 | 3/1966 | Walter | 210/444 |
| 3,258,899 | 7/1966 | Coffin | 55/179 X |
| 3,323,292 | 6/1967 | Brown | 55/179 X |
| 3,353,339 | 11/1967 | Walter | 55/387 X |
| 3,464,186 | 9/1969 | Hankison et al. | 96/137 X |
| 3,505,783 | 4/1970 | Graham | 55/275 X |
| 3,572,008 | 3/1971 | Hankison et al. | 95/122 X |
| 3,680,283 | 8/1972 | Jones, Jr. | 96/138 |
| 3,684,100 | 8/1972 | Close | 210/444 |
| 3,686,835 | 8/1972 | Strange et al. | 210/445 X |
| 3,705,480 | 12/1972 | Wireman | 55/275 X |
| 3,841,484 | 10/1974 | Domnick | 55/274 X |
| 3,897,342 | 7/1975 | Schmid et al. | 210/445 |
| 3,961,919 | 6/1976 | Lamoreaux | 96/138 X |
| 4,015,959 | 4/1977 | Grote | 55/274 X |
| 4,029,486 | 6/1977 | Frantz | 96/137 |
| 4,097,248 | 6/1978 | Frantz | 95/122 X |
| 4,126,559 | 11/1978 | Cooper | 210/445 |
| 4,131,442 | 12/1978 | Frantz | 96/137 |
| 4,199,331 | 4/1980 | Frantz | 96/130 X |
| 4,231,768 | 11/1980 | Siebert et al. | 55/316 X |
| 4,322,228 | 3/1982 | Myers et al. | 55/389 X |
| 4,361,425 | 11/1982 | Hata | 96/140 |
| 4,367,081 | 1/1983 | Harvey | 210/445 X |
| 4,373,938 | 2/1983 | McCombs | 55/389 |
| 4,502,954 | 3/1985 | Druffel | 210/444 X |
| 4,530,706 | 7/1985 | Jones | 55/275 X |
| 4,572,725 | 2/1986 | Kojima | 55/274 X |
| 4,659,467 | 4/1987 | Spearman | 55/389 X |
| 4,741,697 | 5/1988 | Herbison | 55/274 X |
| 4,746,338 | 5/1988 | Williams | 96/132 X |
| 4,790,860 | 12/1988 | Sexton | 55/274 X |
| 4,822,387 | 4/1989 | Daniels | 55/323 |
| 4,891,051 | 1/1990 | Frantz | 96/130 X |
| 4,892,569 | 1/1990 | Kojima | 96/137 X |
| 4,986,840 | 1/1991 | Mori et al. | 55/387 X |
| 5,022,986 | 6/1991 | Lang | 210/444 X |
| 5,110,330 | 5/1992 | Loughran | 55/275 X |
| 5,171,336 | 12/1992 | Shulick | 55/275 X |
| 5,302,284 | 4/1994 | Zeiner et al. | 210/444 X |
| 5,427,609 | 6/1995 | Zoglman et al. | 95/122 X |

5,667,566

APPARATUS FOR WATER VAPOR REMOVAL FROM A COMPRESSED GAS

This application is a continuation of U.S. Ser. No. 08/347,553, filed Nov. 29, 1994, now abandoned, which in turn is a continuation-in-part of U.S. Ser. No. 07/755,694, filed Sep. 6, 1991, now U.S. Pat. No. 5,403,387.

FIELD OF THE INVENTION

The invention relates to apparatus for removing moisture from a gas, and in particular, to apparatus for removal of vapor and water droplets from a compressed air line having a series of moisture traps, including a renewable desiccant material contained in an easily replaced canister inside a final housing.

BACKGROUND OF THE INVENTION

It is desirable to provide compressed air and other gases at low humidity levels for use in a device or a process. One example of this is the use of compressed air in a dust collection device. Dust from a manufacturing operation is collected on the outside of a bag filter. These bag filters operate in bag houses which are generally located outside in potentially cold environments. The dust which collects on the bag surface is separated from the filter bag with the use of compressed air. If the air is high in relative humidity, the dust will be wet and be retained on the bag. This will reduce the efficiency of the bag filter. The lower the dew point of the compressed air to the bag filter, the less possibility for condensation to effect the performance of the bag house.

Many devices are known to remove water from compressed air systems. These devices can be broken down into two basic types. The first is a style of filter which relies on velocity changes and flow path interruptions to remove condensed liquids from the air stream. This style of moisture removal device has been used for years with tremendous success. An example of this style unit is a non-absorptive coalescent filter as described in U.S. Pat. No. 4,822,387. This style of unit does not, however, appreciably lower the relative humidity of the compressed air.

The other type of moisture removal device passes the compressed air through a body of material which absorbs water. Generally, the water vapor may be passed over a bed of desiccating material, such as activated alumina or silica gel. This style of filter/dryer eventually becomes saturated with water vapor and loses efficiency. The desiccant can be regenerated by heating the desiccant to a high enough temperature to drive off the collected water vapor. Desiccant dryers having a replaceable canister containing desiccant are known. Examples of this are U.S. Pat. No. 2,758,719 to Line; U.S. Pat. No. 3,353,339 to Walter; and U.S. Pat. No. 4,659,467 to Spearman. The '719 patent utilizes a central distribution tube to force wet compressed air to the bottom of a removable but disposable canister containing desiccant.

The distribution tube is rigidly held in place by permanently attached radially extending spiders attached to the shell. This type of assembly limits the means of regenerating the desiccant media and reusing the outer housing. In the '339 patent, the desiccant canister is enclosed in a chamber. The canister itself is made of two concentric tubes which are cemented or otherwise suitably affixed to two end caps. This style of canister is functional but has two design problems: the end caps being cemented do not allow for access to the filter media. The second problem is that with the internal threaded rod, a significant portion of the filtering volume is lost to internal support.

In the '467 patent, the desiccant canister design is again a disposable product, not lending itself to regenerating the desiccant bed. The housing for the bed comprises a top cap which is crimped to an outer shell to form a sealing surface. It would be more practical with this style of design to replace the entire spin on, spin off canister. It is also noted that the '467 patent includes a centrally located distribution tube for flow of wet air to dry air to utilize the entire bed of filtration media. This limits the volume of filtration media which can be installed in the canister.

SUMMARY OF THE INVENTION

The present invention provides an apparatus for the removal of moisture. Preferably, the apparatus will contain a first stage housing which provides for prefiltration upstream from the desiccant housing. The prefilter is preferably of the non-absorptive coalescent filter element design as disclosed in U.S. Pat. No. 4,822,387, which is hereby incorporated by reference. The second housing which is attached with the first via a connection apparatus to prevent the exhaust of compressed air to the atmosphere is a desiccant-type dryer in a moisture removal apparatus.

The moisture removal apparatus is provided with a head with an inlet and outlet port preferably in line with each other. The head has an elliptical outer housing member which seals with the head and forms an elongated chamber in which a desiccant canister is housed. The head also has a threaded stud which is centrally positioned on its lower surface support and is connected to the upper most end of the desiccant canister. The inlet and outlet of the head are separated from each other by cast passageways which force the incoming air downward into the elongated elliptical chamber and around the desiccant canister then upwardly through the media to the exhaust port.

The desiccant media portion is contained in a replaceable canister containing desiccant between a top screen and a bottom screen and supported radially by a tube. The canister is elongated, preferably having a length to diameter ratio greater than three and is of tubular form with the tubular wall being impervious to air on the outside, thereby forcing the air flow down an elongated channel formed by the outside of the canister and the inside of the outer housing member, the desiccant tube being made from plastic or metal and sealed at the top by a top plate which is preferably permanently attached. The top plate has an opening which interfaces with the outlet of the moisture removal apparatus. The top plate incorporates a threaded connection which interconnects with the stud which is attached in the underside of the head of the apparatus. The bottom of the canister is sealed with a perforated desiccant retaining plate. The retaining plate preferably is removable for regeneration or replacement of the desiccant medium, although certain objects of the invention can be obtained when the retaining plate is permanently affixed. In the removable configuration, the retaining plate preferably includes an external ridge which will fit internally of the canister and snap into an internal groove. It is understood that in an alternative form, the bottom plate could be of the design which would slide over the outside of the tube and snap on the outside surface as well or be of a threaded design. The apparatus will also be equipped with a colorimetric indicator to judge the saturation levels of the desiccant media. Preferably, the canister is formed of a material which is non-corrosive and non-reactive with the gas constituents and the desiccant medium. Particularly preferred materials which may be employed for the canister are polycarbonate and polystyrene.

The apparatus effectively removes water droplets and vapor from air or other gases, such as natural gas, and is particularly useful for high performance applications, such as dust removal or paint spraying applications, as well as other critical pneumatic system operations.

It is an object of the invention to provide an apparatus for efficiently removing moisture from an air.

It is a further object of the invention to provide a moisture removal apparatus having a conveniently replaceable canister containing a drying agent.

If is another object of the invention to provide a moisture apparatus which provides an air flow path intersecting a maximum volume of drying agent contained in a canister without the aid of a centralized distribution tube.

It is still another object of the invention to provide a convenient arrangement of conduits and seals in a desiccant canister coupled in a multi-element filter arrangement, whereby the desiccant canister is housed in a removable bowl and head assembly and can be easily removed by unscrewing the canister from the head assembly.

These and other objects are accomplished by an apparatus having a connection head defining an air inlet, an air outlet and a closure surface. The air inlet and the air outlet each extend through the connection head to an inlet port and an outlet port, respectively, in the closure surface. An elongated housing having walls defines an internal cavity. The housing has an open end and an opposite end. The housing is removably attached to the connection head with a clamp ring, such that the closure surface sealingly covers the open end. A desiccant canister is disposed centrally in the cavity created by the connection head and the elongated housing. The desiccant canister is attached to a relatively short support stud which is mounted on the lower side of the connection head. The canister is attached so that a seal is created between the underside of the connection head and the canister. This seal causes inlet air to flow between the inside of the elongated housing and the outside of the desiccant canister in the annular channel created by the two pieces. The air flow continues to the bottom of the housing and inverts and enters the desiccant canister at the canister bottom. The air passes through the bottom retaining plate, through the lower screen and then enters the desiccant bed. The air travels in an upward direction and passes through the upper screen and final filter assembly, finally exiting the canister via the outlet port of the housing.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawing, wherein.

DETAILED DESCRIPTION OF THE PREFERRED EMBODIMENTS

Figure 1:
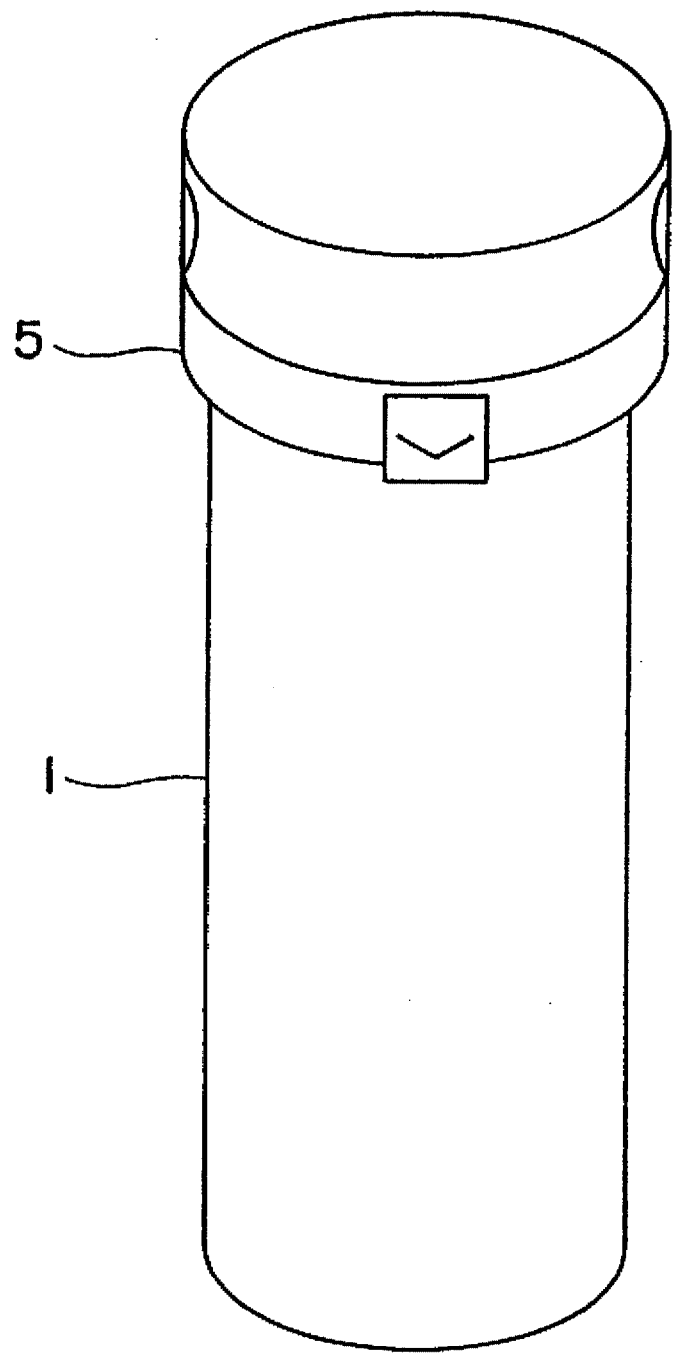
FIG. 1 is a perspective view of an apparatus for removing moisture from an air according to the invention.
Figure 2:
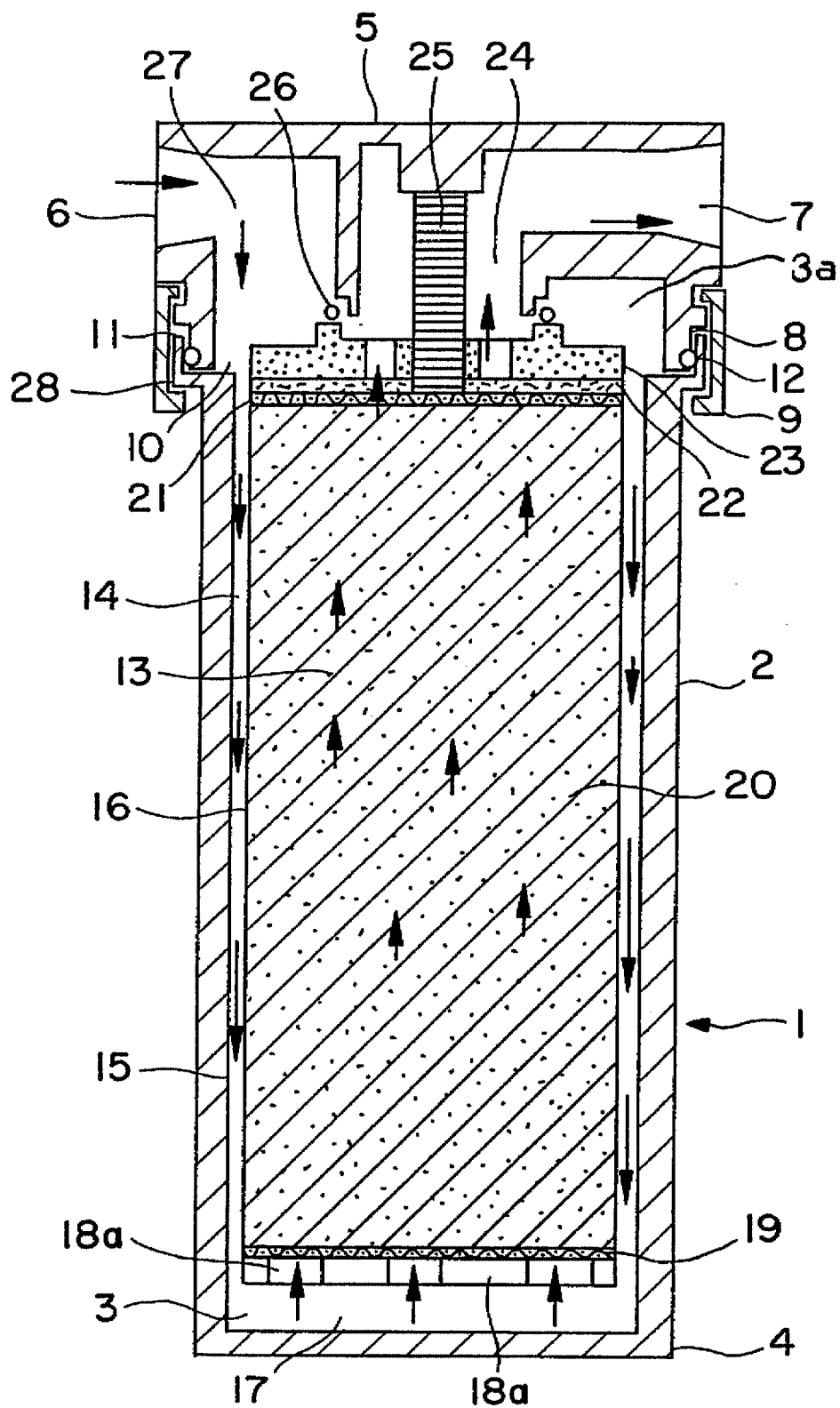
FIG. 2 is a cross-sectional view of an apparatus for removing moisture from an air according to the invention showing an air flow path through the apparatus.

An apparatus for removing moisture from a gas, such as air, according to the invention as shown in FIGS. 1 and 2 includes an elongated housing 1 having walls 2 defining an internal cavity 3. The elongated housing 1 has an open end 3a and an opposite closed end 4. A connection head 5 defines an air inlet 6, an air outlet 7 and a closure surface 8. The housing 1 defines a first canister which is removably attached to the connection head 5 with the aid of a resilient clamp ring 9 such that the closure surface 8 is sealingly covered by the open end 10 around an upper edge 11 of the walls 2. Sealing means, including O-ring 12, is provided to prevent air leakage between the housing 1 and the closure surface 8. The sealing means is compressed between the respective portions of the first canister and the connection head when the first canister is coupled to the connection head with the use of the clamp ring. This arrangement allows for effective replacement or removal or regeneration of the desiccant materials, as can be seen from the following.

An elongated desiccant canister 13 is disposed within cavity 3. The desiccant canister forms an annular channel 14 between the inside of canister wall 15 and the outer surface 16 of wall 15. The inlet air flows through this annular channel to canister bottom 17 where the air inverts and enters the canister through orifices 18a in bottom retaining plate 18. When the desiccant canister is not intended to be a disposable item, the plate 18 is removably attached by suitable means, such as detents or screw threads. The air then passes through lower support screen 19 and enters the desiccant media 20. The air continues upward through the upper screen 21 and the final filter pad 22 to the exit plate 23 and finally to the outlet orifice 24 in the head 5. Final filter pad 22 is effective to remove desiccant dust which may be entrained in the air stream. The canister exit plate 23 is rigidly supported by support stud 25 mounted in head 5 so that a positive seal is created with O-ring 26 when the canister is tightened against the head.

Preferably, canister 13 is formed of a material, such as polycarbonate or polystyrene, which is non-reactive with the gas constituents and the canister contents. The canister is preferably elongated, having a length to diameter ratio of at least three in preferred form.

Figure 3:
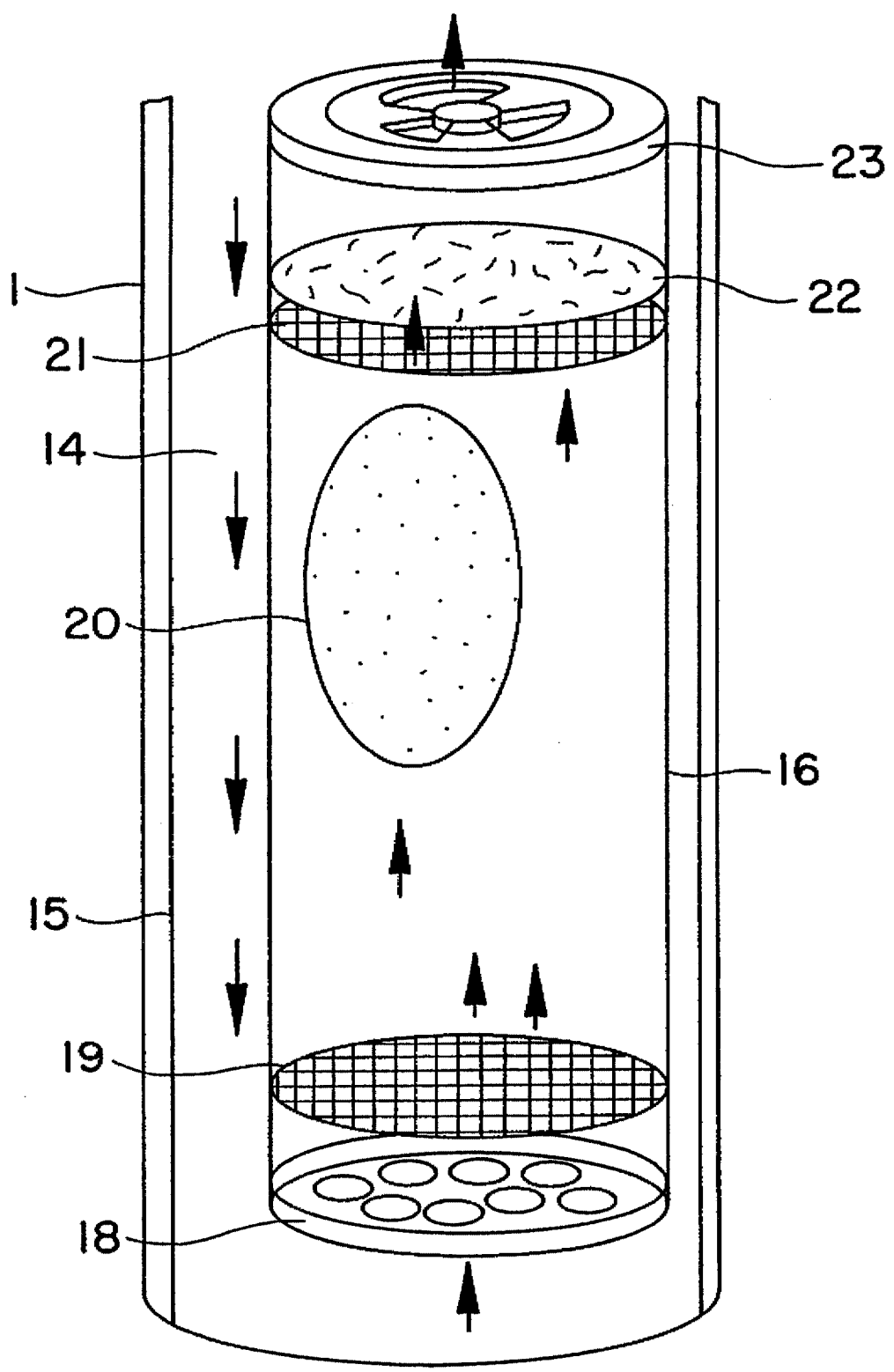
FIG. 3 is a cross-sectional view of a desiccant canister for moisture removal.

As shown in FIG. 3, the air inlet 6 defines a flow path extending through the connection head 5 to inlet port 27 in the closure surface 8. The air outlet 7 similarly defines a path extending through the head 5 to an outlet port 24 in the closure surface. The air inlet 6 and the air outlet 7 may be defined in any external surface of the head 5. Preferably, the air inlet 6 and the air outlet 7 are collinear, for example, aligned on diametrically opposite sides of the head 5 so that the head can be installed in a straight line section of a fluid system.

Preferably, the housing 1 is an impact extruded, cylindrical bowl formed of a material such as polycarbonate. The bowl has an upper flange 28 which is supported by a resilient clamp ring 9 when the final connection of the parts is made. The desiccant material 20 which is preferably silica gel or silica gel and alumina for removal of moisture from air internal of the canister 13 and will become saturated during normal operations of the unit. In order to regenerate this material, the housing 1 can be unclamped from the head 5 and the canister 13 removed by unscrewing from the support stud 25. The canister may then be disassembled by removing lower support plate 18, removing the bottom support screen 19 and emptying the desiccant onto a tray for servicing. Saturated desiccant material 20 can be renewed repeatedly by baking, for example, at 375° F. for 10–15 minutes to drive off absorbed moisture and renew the ability of the desiccant material to absorb more. The canister 13 offers the ability to easily service the beads or replace the beads or replace the entire canister.

Figure 4:
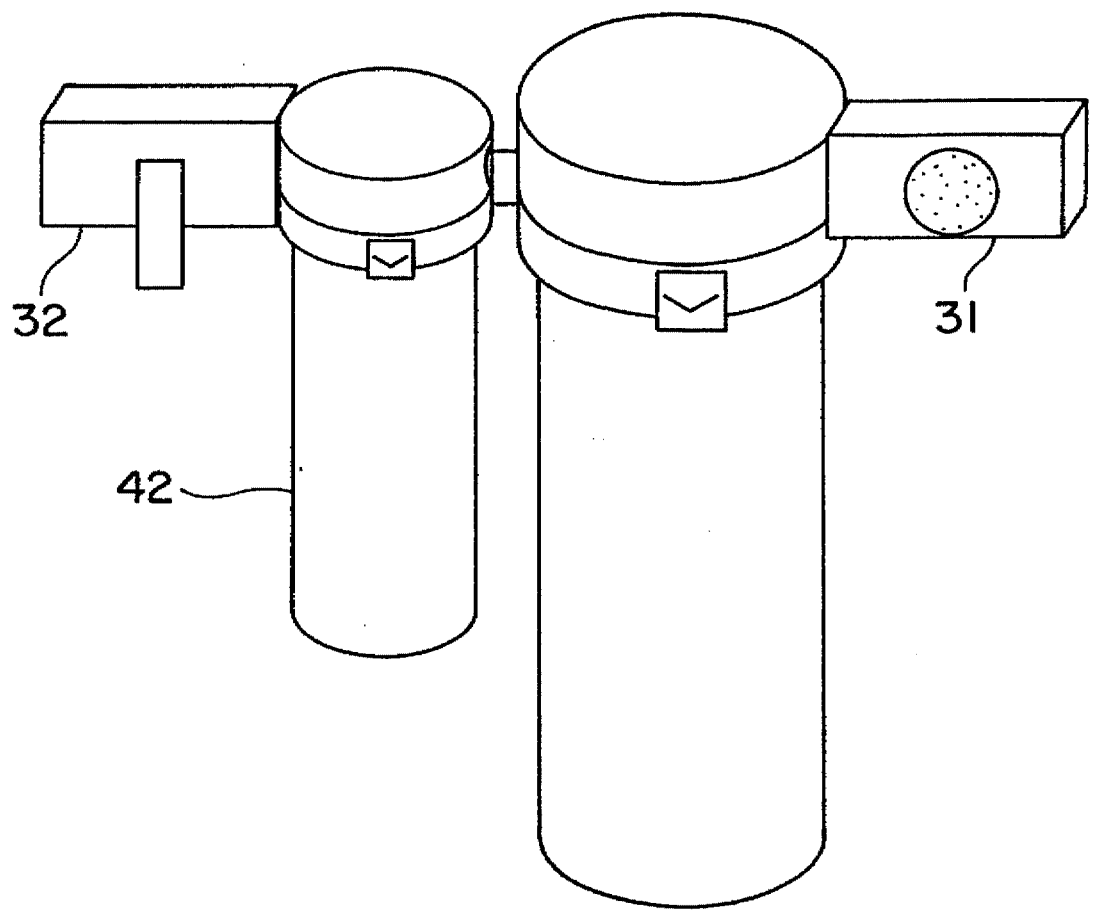
FIG. 4 is an overall perspective view of an air filtering and drying system according to the invention.

Although not limited thereto, the moisture removal apparatus according to the invention is preferably an element in an air filtering system. As shown in FIG. 4, the system includes a primary filter 42 which may be any suitable filter known in the art as effective to remove water and oil droplets. Preferably, the primary filter 29 is a combination dryer/filter as disclosed in applicants' U.S. Pat. No. 4,822,387, including a coalescent material and an absorptive pad in a stacked arrangement in a central tube with a narrow annular flow path defined downwardly in the filter housing, around a sharp reversal and axially upward through the coalescent material and through an absorptive media. The combination dryer/filter utilizes the reversal of flow to remove a portion of the moisture in the air. The larger cross-section of the axial path compared to the annular one also reduces air velocity, aids in producing condensation and reduces the tendency of water droplets captured by the coalescent filter to become reentrained in the air. The condensate is collected in a bottom of the dryer/filter housing and is drained through a drain valve, not illustrated.

The system further includes a moisture detection apparatus 31 which is used to indicate the efficiency of the desiccant beads housed in the canister and an inlet ball valve 32 which enables service of the unit without shutdown of the entire air system. A simple and effective detector is provided by silica gel beads coated with cobalt chloride and housed within the air stream behind a viewing window. A change of color from blue to red indicates to the user that the desiccant bed is saturated. The air filtering and drying system can be installed in a branch of a compressed air system to supply clean, dry air for specific applications, thus avoiding the need to clean and dry all of the compressed air in a large system. Preferably, the system is disposed in close proximity to the station at which the air will be used, for example, at a spray painting booth or the like.

The invention having been disclosed, a number of variations will now become apparent to persons in the art. The invention is intended to encompass not only the preferred embodiments mentioned above, but also a reasonable range of equivalents. Reference should be made to the appended claims rather than the foregoing discussion of preferred examples in order to evaluate the scope of the invention in which exclusive rights are claimed.

We claim:

1. Apparatus for removing moisture from a gas comprising:
    a connection head defining a gas inlet passage, a gas outlet passage and a closure surface, said inlet and outlet passages extending through the connection head and ports located on the closure surface with which said inlet and outlet passages respectively communicate;
    an elongated housing having an annular wall defining an internal housing cavity, the housing having an open end and a closed end;
    means for removably attaching the housing to the connection head including a sealing surface surrounding the ports on the closure surface, a sealing ring interengagable with the sealing surface and with the elongated housing at the open end thereof;
    an elongated desiccant canister disposed within the housing cavity, the canister having gas impervious side walls extending substantially the length of the elongated housing, the side walls of the desiccant canister being spaced radially inwardly from the walls of the elongated housing and creating an annular channel for channeling a gas flow extending substantially exclusively vertically downwardly to the bottom of the cavity;
    the canister having a first end defining an inlet near the bottom of the cavity and a second end including an end plate defining an outlet in communication with the gas outlet passage port;
    canister attachment means for removably attaching the canister second end to said connection head, said canister attachment means comprising a spin-on threaded connector between the connection head and the end plate of the canister, said spin-on connector terminating in said end plate so as to maximize the interior space within the canister and a second sealing ring between the connection head and the canister end plate, said second sealing ring surrounding the outlet port, said second sealing ring being engaged with the connection head and the canister outlet for sealing the outlet port from the inlet port when the canister is attached;
    the means for removably attaching the housing to the connection head further comprising a resilient clamping ring; and
    a desiccant material disposed within the canister and substantially filling the canister between the first and second ends, whereby gas moves through said apparatus along a path through said gas inlet, through said annular channel, through said canister, through said desiccant material and through said gas outlet.

2. The apparatus according to claim 1, wherein the desiccant canister is disposed substantially centrally within the cavity.

3. The apparatus according to claim 1, wherein the elongated housing defines an elongation axis in a direction of elongation and the desiccant canister is disposed substantially along the elongation axis.

4. Apparatus according to claim 3, wherein said spin-on threaded connector is threadedly secured to the end plate of said canister.

5. The apparatus according to claim 4, wherein the first end of the canister is removably attached with plural orifices for air pass through.

6. The apparatus according to claim 5, wherein said canister has a length to diameter ratio greater than three.

7. The apparatus according to claim 1, wherein the canister is equipped with an upper and a lower retaining means for confining the desiccant within the canister, the retaining means permitting passage of the air therethrough.

8. The apparatus according to claim 7, wherein the upper and lower retaining means is a wire mesh.

9. The apparatus according to claim 1, wherein the desiccant material comprises a mixture of activated alumina and silica gel.

10. The apparatus according to claim 1, wherein the housing is substantially cylindrical.

11. An air drying apparatus according to claim 1 equipped with a dew point indicator connected to said outlet port to colorimetrically indicate changes in desiccant material saturation levels.

12. An air drying apparatus according to claim 11, wherein the canister is comprised of a non-corrosive material which is non-reactive with the desiccant material and the air constituents.

13. An air drying apparatus according to claim 12, further including an inlet valve closably connected to said inlet port to service the unit without shutdown of the compressed air system.

* * * * *